# (12) United States Patent
Wu

(10) Patent No.: US 6,400,284 B2
(45) Date of Patent: *Jun. 4, 2002

(54) FINGER OPERATED MODULE FOR GENERATING ENCODING SIGNALS

(75) Inventor: Chih-Hsiung Wu, Taipei Hsien (TW)

(73) Assignee: Primax Electronics, Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/865,595

(22) Filed: May 29, 2001

Related U.S. Application Data

(63) Continuation of application No. 09/152,668, filed on Sep. 14, 1998, now Pat. No. 6,292,113, which is a continuation of application No. 08/823,134, filed on Mar. 25, 1997, now Pat. No. 5,808,568.

(51) Int. Cl.$^7$ .................................................. G09G 5/08
(52) U.S. Cl. ........................... 341/20; 345/163; 345/166
(58) Field of Search ........................... 341/20; 345/166, 345/163, 157, 164, 165, 167

(56) References Cited

U.S. PATENT DOCUMENTS

| | | |
|---|---|---|
| 4,464,652 A | 8/1984 | Lapson et al. |
| 4,928,093 A | 5/1990 | Rahman |
| 4,952,919 A | 8/1990 | Nippoldt |
| 4,982,618 A | 1/1991 | Culver |
| 5,095,302 A | 3/1992 | McLean et al. |
| 5,095,303 A | 3/1992 | Clark et al. |
| 5,132,672 A | 7/1992 | Clark |
| 5,161,313 A | 11/1992 | Rijlaarsadam |
| 5,298,919 A | 3/1994 | Chang |
| 5,313,229 A | 5/1994 | Gilligan et al. |
| 5,313,230 A | 5/1994 | Venolia et al. |
| 5,374,942 A | 12/1994 | Gilligan et al. |
| 5,446,481 A | 8/1995 | Gillick et al. |
| 5,450,075 A | 9/1995 | Waddington |
| 5,457,479 A | 10/1995 | Cheng |
| 5,473,344 A | 12/1995 | Bacon et al. |
| 5,530,455 A | 6/1996 | Gillick et al. |
| 5,557,440 A | 9/1996 | Hanson et al. |
| 5,712,725 A | 1/1998 | Faltermeier et al. |
| 5,771,038 A | 6/1998 | Wang |
| 5,912,661 A | 6/1999 | Siddiqui |
| 6,014,130 A | 1/2000 | Yung-Chou |
| 6,097,964 A * | 8/2000 | Nuovo et al. ............... 455/550 |
| 6,157,369 A | 12/2000 | Merminod et al. |

FOREIGN PATENT DOCUMENTS

| | | |
|---|---|---|
| DE | 3 610 501 A1 | 10/1986 |
| DE | 4 415 314 C1 | 6/1995 |
| DE | 296 17 123 U1 | 11/1996 |
| DE | 297 01 466 U1 | 4/1997 |
| DE | 297 16 864 U1 | 12/1997 |

(List continued on next page.)

Primary Examiner—Michael Horabik
Assistant Examiner—Albert K. Wong
(74) Attorney, Agent, or Firm—Bacon & Thomas

(57) ABSTRACT

A finger operated module generates encoding signals by controlling transmission of light in response to finger operation of the module. The module includes a base member, a supporting member movably installed on the base member, and a rotating member rotatably installed on the supporting member, the rotating member partially protruding from a surface of the input device for enabling finger operation. An encoding signal generating media for controlling the transmitted light is provided on a first surface of the rotating member.

30 Claims, 4 Drawing Sheets

FOREIGN PATENT DOCUMENTS

| | | |
|---|---|---|
| EP | 0 531 829 A1 | 9/1993 |
| GB | 2 309 507 | 7/1997 |
| GB | 2 321 692 | 8/1998 |
| JP | 63-216224 | 9/1988 |
| JP | 63-199335 | 12/1988 |
| JP | 02-235131 | 9/1990 |
| JP | 03-90338 | 9/1991 |
| JP | 4-186417 | 7/1992 |
| JP | 5-131852 | 5/1993 |
| JP | 5-55432 | 7/1993 |
| JP | 06-250781 | 9/1994 |
| JP | 60-175137 | 9/1995 |
| JP | 3050051 | 6/1998 |
| JP | 10-149745 | 6/1998 |
| JP | 10-177831 | 6/1998 |
| JP | 10-326144 | 12/1998 |
| JP | 10-340158 | 12/1998 |
| TW | 095299 | 1/1988 |
| TW | 147205 | 12/1990 |
| TW | 148492 | 12/1990 |
| TW | 210764 | 8/1993 |
| TW | 220410 | 2/1994 |
| TW | 261261 | 10/1995 |
| TW | 264074 | 11/1995 |
| TW | 273912 | 4/1996 |
| TW | 278078 | 6/1996 |
| TW | 281325 | 7/1996 |
| TW | 207518 | 2/1997 |
| TW | 308680 | 6/1997 |
| TW | 3039992 | 8/1997 |
| TW | 315011 | 9/1997 |
| TW | 316696 | 9/1997 |

* cited by examiner

FINGER OPERATED MODULE FOR GENERATING ENCODING SIGNALS

This application is a continuation of U.S. patent application Ser. No. 09/152,668, filed Sep. 14 1998, now U.S. Pat. No. 6,292,113, which is a continuation of Ser. No. 08/823,134, filed Mar. 25, 1997 now U.S. Pat. No. 5,808,568.

BACKGROUND OF THE INVENTION

1. Field of the Invention

The present invention relates to an operation interface, and more particularly, to a finger operated module for generating encoding signals.

2. Description of the Prior Art

A computer mouse is a very popular computer peripheral which can be used to control cursor movement and function selection for application software under Windows™ or a similar operating system. A traditional computer mouse used by a personal computer is usually a two-dimensional one for controlling the cursor movement in an X-Y plane on the monitor screen, and key buttons are provided on the mouse to be selected according to the requirements of the application software.

However, such a two-dimensional computer mouse can no longer meet users' needs in view of the increased requirements for convenience in operating system interfaces. A three-dimensional computer mouse has thus been created which can be used to define certain system control functions, e.g. scrolling of a window frame, of a Windows™ or similar operating system for providing users a more rapid and convenient input device.

SUMMARY OF THE INVENTION

It is therefore a primary object of the present invention to provide a finger operated module for generating encoding signals which is used to generate encoding signals in response to operation by a finger to control transmission of light by the module, and wherein the module partially protrudes from one surface of an input device.

Briefly, in a preferred embodiment, the present invention comprises:

(1) a base member;
(2) a supporting member movably installed on the base member; and
(3) a rotating member rotatable on the supporting member and partially protruding from the surface of the input device for accommodating the finger operation;

wherein an encoding signal generating media for controlling the transmitted light is provided on a first surface of the rotating member.

In accordance with a first aspect of the present invention, the module further comprises a printed circuit board mounted on the supporting member, a light emitting element mounted on the printed circuit board adjacent to the first surface of the rotating member for generating the light transmitted through the encoding signal generating media, and a light responsive element mounted on the printed circuit board adjacent to a second surface of the rotating member for receiving the light to generate digital signals, and wherein the light emitting element and the light responsive element are able to be synchronously moved with the supporting member.

In accordance with a second aspect of the present invention, the base member has a positioning plate and a pair of supporting pieces orthogonal to the positioning plate, and each of the supporting pieces has a groove for allowing the supporting member to be movably installed on the base member. The rotating member includes an axle rotatably coupled to the supporting member.

In accordance with a third aspect of the present invention, the supporting member comprises a first supporting element, a second supporting element and a connecting element for connecting the first and second supporting elements, wherein the first supporting element includes a first axis accommodated within the groove of one of the supporting pieces, and a first positioning hole for engaging the axis of the rotating member, the second supporting element includes a second axis accommodated within the groove of the other one of the supporting pieces, and a second positioning hole for engaging the axis of the rotating member.

In accordance with a fourth aspect of the present invention, the module further comprises an elastic member mounted on the supporting member, which has a first elastic arm biased against a protruding portion of the supporting member and a second elastic arm biased against the base member for providing the supporting member a spring force.

In accordance with a fifth aspect of the present invention, the elastic member is mounted on the first axis of the first supporting element. The first supporting element further includes a protruding post for engaging a switch installed in the input device when the rotating member is movably depressed. The encoding signal generating media can be a plurality of apertures which are disposed on a circumference of the surface of the rotating member.

In accordance with a sixth aspect of the present invention, the module further comprises a plurality of protuberances disposed on the circumference of the first surface of the rotating member, and a contact element mounted between the first and second supporting elements. The contact element has a protrusion for correspondingly engaging with the protuberances to cause intermittent interception when the rotating member is rotated.

In accordance with a seventh aspect of the present invention, the input device is a computer mouse.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
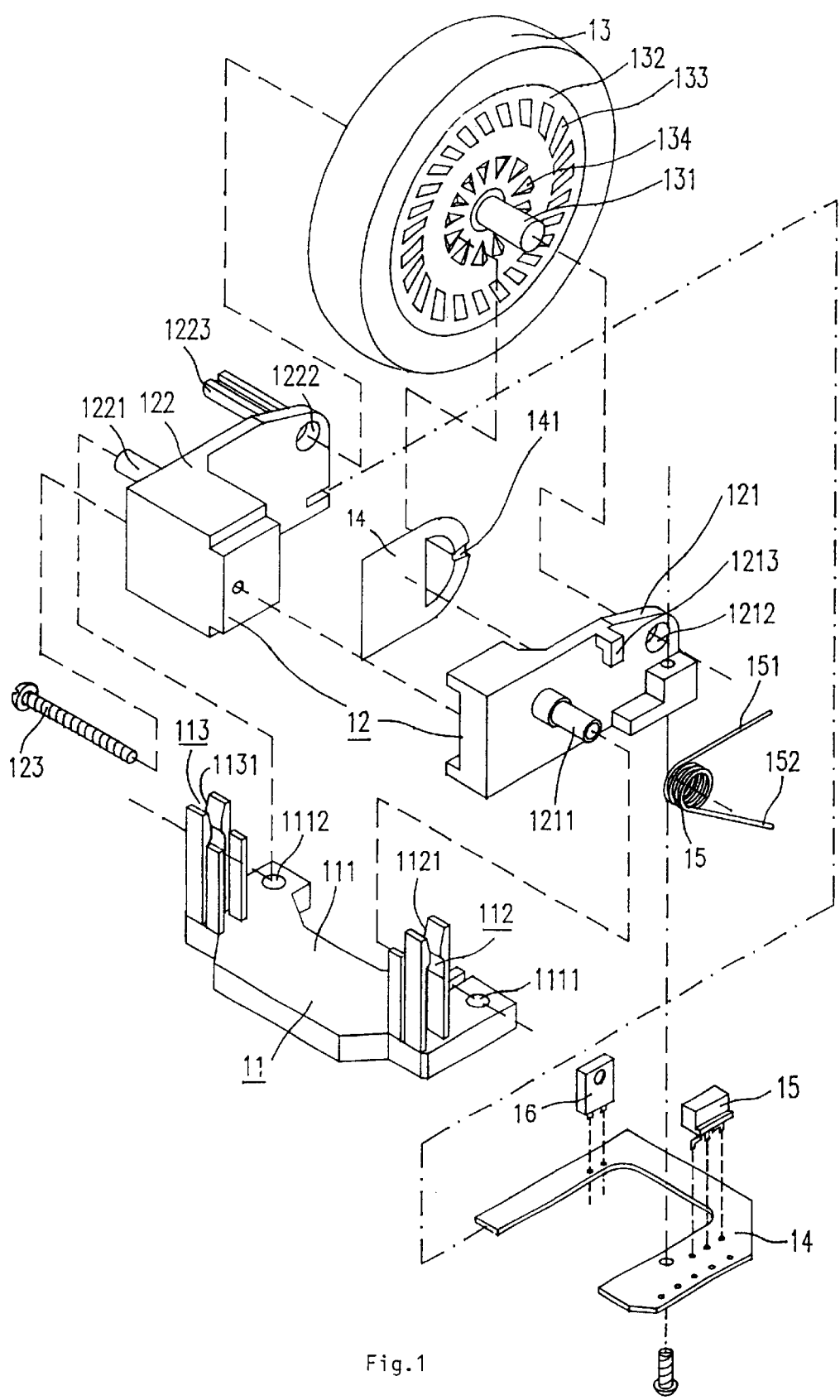
FIG. 1 is an exploded perspective view of a preferred embodiment of a finger operated module according to the present invention.

Please refer to FIG. 1, which is an exploded view of a preferred embodiment of a finger operated module according to the present invention. The finger operated module comprises a base member 11, a supporting member 12, a rotating member 13, a printed circuit board 14, a light emitting element 15 and a light responsive element 16.

A positioning plate 111 and a pair of supporting pieces 112, 113 orthogonal to the positioning plate 111 are provided on the base member 11, each of the supporting pieces 112, 113 having a groove 1121, 1131. The positioning plate 111 includes a pair of positioning holes 1111, 1112 for allowing the present finger operated module to be installed at the bottom of an input device, for instance a computer mouse. The supporting member 12 comprises a first supporting element 121, a second supporting element 122 and a connecting element 123 which by way of example may be a screw. The first supporting element 121 includes a first axle 1211, a first positioning hole 1212 and a protruding portion 1213; the second supporting element 122 includes a second axle 1221, a second positioning hole 1222 and a protruding post 1223. The rotating member 13 includes an axle 131 and an encoding signal generating media, where such encoding signal generating media can be a plurality of apertures 133 which are disposed on a circumference of the surface 132 of the rotating member 13.

The preferred module further comprises a plurality of protuberances 134 disposed on the circumference of the surface 132 of the rotating member 13, a contact element 14 having a protrusion 141 thereon, and an elastic member 15 having a first elastic arm 151 and a second elastic arm 152.

The printed circuit board 14 is mounted in a traditional manner, e.g. by a screw, on the supporting member 12, the light emitting element 15 is mounted on the printed circuit board 14 adjacent to the first surface 132 of the rotating member 13 for generating a light to be transmitted through the encoding signal generating media, and the light responsive element 16 is mounted on the printed circuit board 14 adjacent to a second surface (not shown) of the rotating member 13 for receiving the transmitted light to generate digital signals, so that the light emitting element 15 and the light responsive element 16 are able to be synchronously moved with the supporting member 12.

Figure 2:
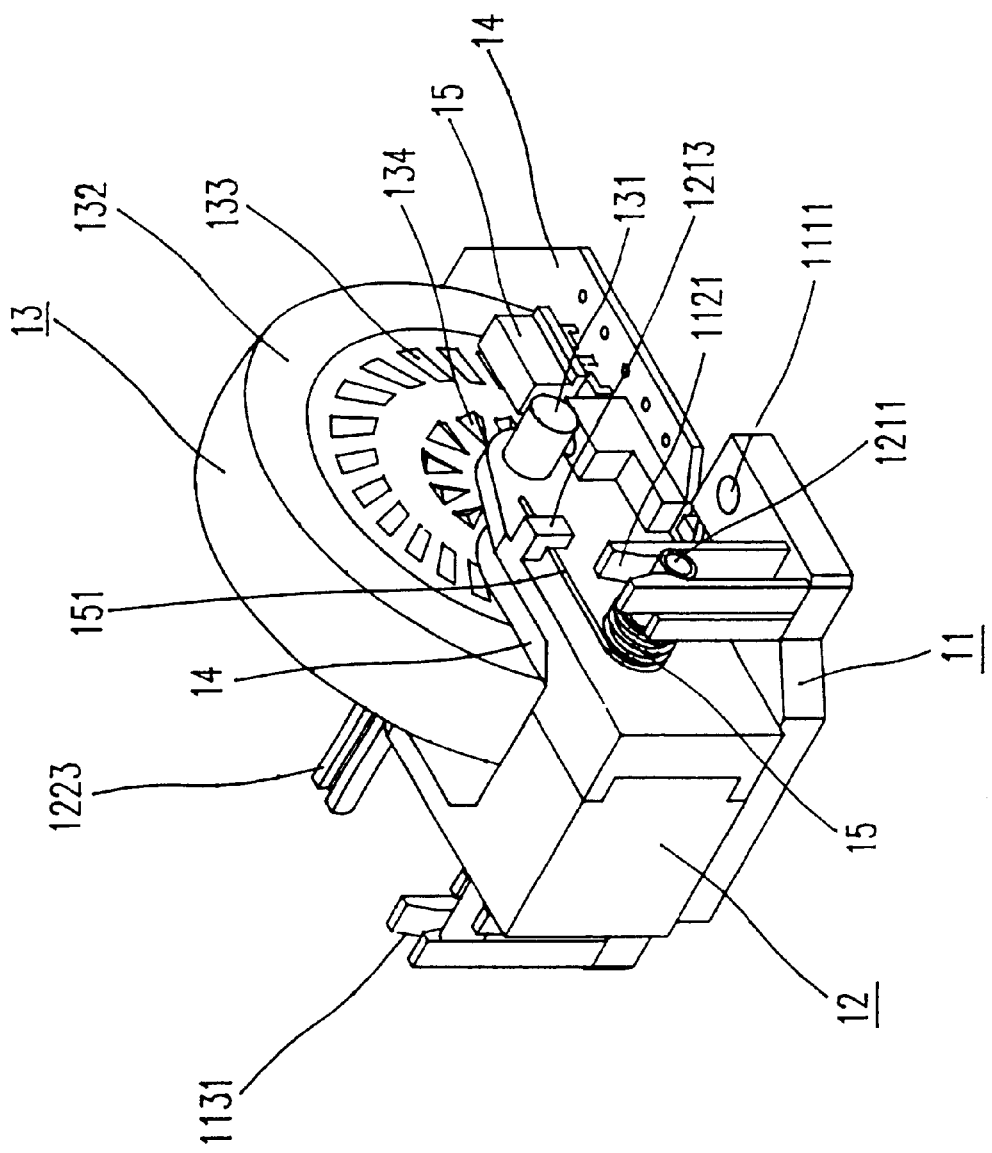
FIG. 2 is an assembled perspective view of the preferred embodiment of FIG. 1.

Please refer to FIGS. 1 and 2 which show the assembly of the present invention. The present module is assembled by the following steps: (a) connecting the first supporting element 121 and the second supporting element 122 by means of the connecting element 123 for allowing the contact element 14 to be installed between the first and second supporting elements 121, 122; (b) inserting both ends of the axis 131 of the rotating member 13 into the first and second grooves 1212, 1222 of the first and second supporting elements 121, 122, respectively, for allowing the rotating member 13 to be rotatably installed on the supporting member 12; (c) mounting the elastic member 15 on the first axis 1211 of the first supporting element 121 and biasing the first elastic arm 151 of the elastic member against the protruding portion 1213 of the first supporting element 121; (d) accommodating the first and second axes 1211, 1221 of the first and second supporting elements 121, 122 within the grooves 1121, 1131 of the pair of supporting pieces 112, 113, respectively, for allowing the supporting member 12 to be movably installed on the base member 11, and biasing the second elastic arm 152 of the elastic member 15 bias against the positioning plate 111 of the base member 11.

Figure 3:
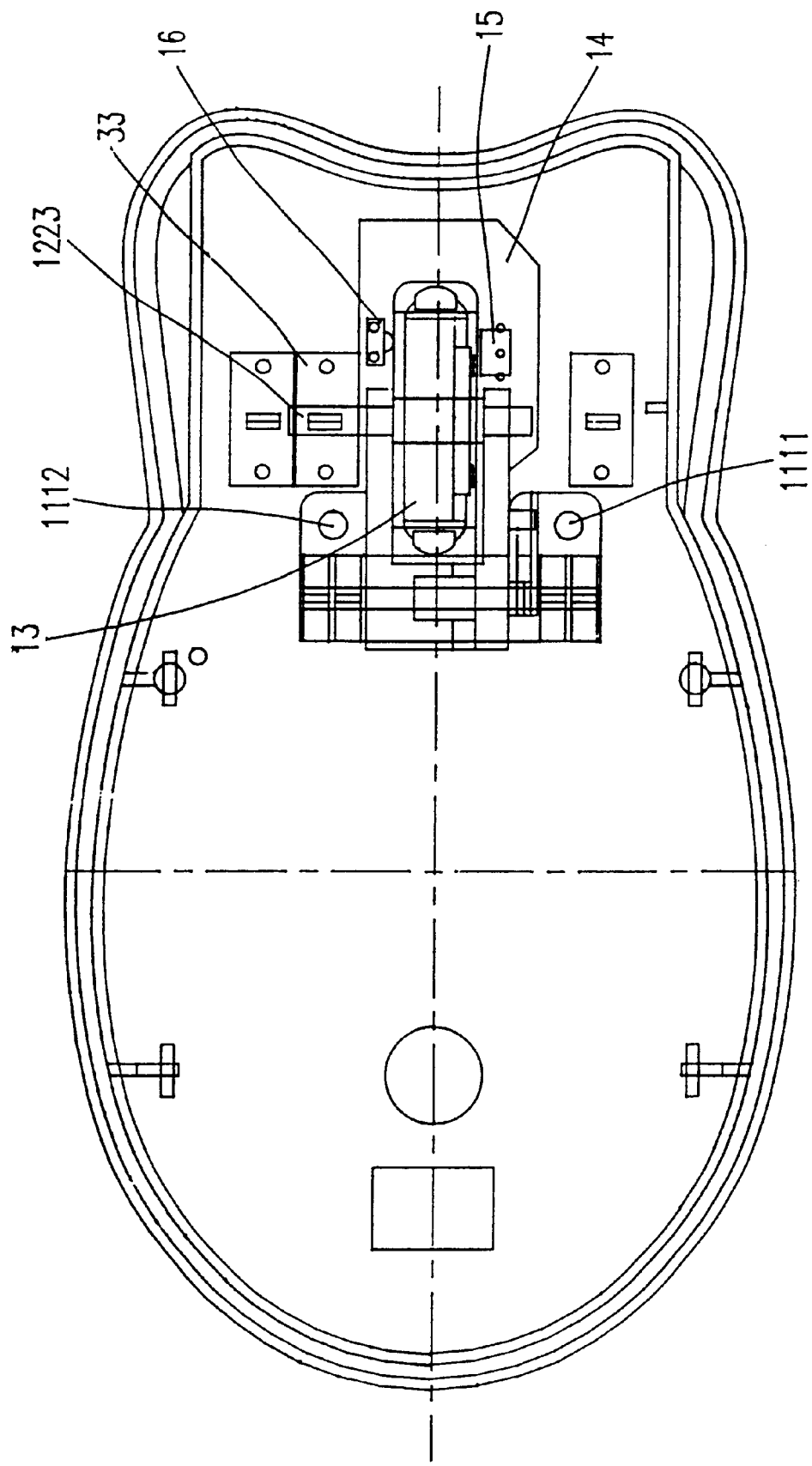
FIG. 3 is an upper plane view illustrating the preferred finger operated module installed in an input device according to the present invention.
Figure 4:
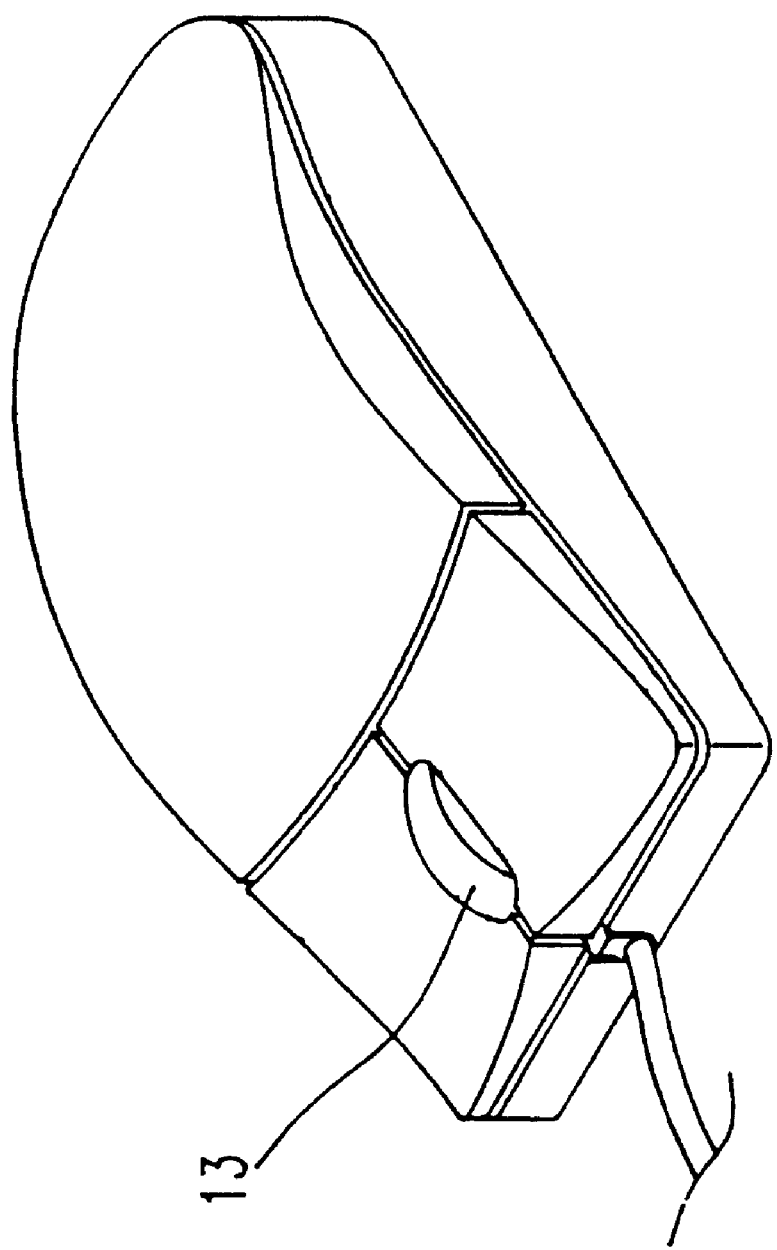
FIG. 4 is a perspective view illustrating the assembly of the preferred module and the input device.

The operation method of the present invention can be referred to FIG. 3 which is an upper plane view illustrating the preferred finger operated module installed in an input device. The module can be installed on e.g. the bottom of the computer mouse by means of the positioning holes 1111, 1112 of the positioning plate 111 of the base member 11. After the module and the computer mouse are assembled, the rotating member 13 will partially protrude from one surface of the computer mouse, as illustrated in FIG. 4, to be used as a user interface. When the rotating member 13 is rotated by fingers, penetrating/shielding effects of the light transmitted by the light emitting element 15 through the apertures 133 on the circumference of the surface 132 of the rotating member 13 to the light responsive element 16 will be generated in response to the rotation of the rotating member 13, so that the light responsive element 16 will thus generate encoding signals in the manner of a traditional computer mouse.

In the meantime, the protrusion 141 of the contact element 14 will correspondingly engage with the protuberances 134 to cause intermittent interception (please refer to FIG. 2) when the rotating member 13 is rotated.

Furthermore, the supporting member 12 will move downward and its protruding post 1223 will in the meantime engage with a switch 33 installed in the computer mouse to keep it in a "turn on" status, when the rotating member 13 is depressed. The light emitting element 15 and the light responsive element 16 will be synchronously moved with the supporting member 12, and when the finger pressure ceases, the supporting member 12 will return to its previous position by means of the spring force provided by the elastic member 15. The protruding post 1223 will then disengage with the switch 33 and return it to its "turn off" status. The aforementioned switch 33 is similar to that of a traditional computer mouse which can perform a specific command.

It deserves a more detailed description that in encoding signals generated by engagement of the switch 33 can be avoided based on the synchronous movement of the light emitting element 15 and the light responsive element 16 with the supporting member 12. If the light emitting element 15 and the light responsive element 16 are not synchronously moved with the supporting member 12, a correspondent movement between the two elements 15, 16 will probably occur, when the rotating member 13 is depressed. That is to say, digital signals with noise are generated after the light responsive element 16 receives an abnormal status change of lights transmitted between the two elements 15, 16. Such a drawback is efficiently eliminated by the present invention.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A computer mouse, comprising:
    a housing; and
    a finger operated module coupled to said housing, including:
        a printed circuit board;
        a wheel being translationally and rotationally coupled to said printed circuit board, wherein said wheel partially protrudes from a top surface of said housing to enable said wheel to be rotated and translated by said finger operation, said wheel including at least one radially projecting side surface; and
        a plurality of apertures being formed through said side surface of said wheel for controlling a transmitted light signal for generating encoded signals as said wheel is rotated.

2. A computer mouse as described in claim 1, further comprising:
    a light emitting element being disposed adjacent to one side of said wheel for generating light rays; and
    a light responsive element being disposed adjacent to a second side of said wheel for receiving said light rays and generating encoding signals accordingly.

3. A computer mouse as described in claim 1, further including a wheel support frame, wherein said wheel is coupled to said frame and said frame is coupled to said printed circuit board.

4. A computer mouse as described in claim 3, wherein said wheel includes an axle rotatably coupled to said wheel support frame.

5. A computer mouse as described in claim 4, further comprising a resilient spring coupled to said wheel support frame and enabling said wheel to be translated to activate a switch.

6. A computer mouse as described in claim 1, further comprising a plurality of protuberances disposed on said wheel for engagement with a contact element to generate intermittent interception therebetween when said wheel is being rotated.

7. A computer mouse as described in claim 1, wherein said apertures are disposed proximate the circumference of said side surface.

8. A computer mouse, comprising:
   a housing;
   a printed circuit board being engaged to said housing;
   a wheel supporting member being coupled to said printed circuit board;
   a wheel being translationally and rotatably coupled to portions of said wheel supporting member, wherein said wheel partially protrudes from a top surface of said housing to enable said wheel to be rotated and translated by a finger operation; and
   an encoding disc being formed within said wheel and operative to cause encoding signals to be generated.

9. A computer mouse as described in claim 8, further comprising:
   a light emitting element disposed adjacent to one side of said encoding disc for generating light rays; and
   a light responsive element adjacent to a second side of said encoding disc for receiving said light rays and generating encoding signals accordingly.

10. A computer mouse as described in claim 8, further comprising:
    an optical emitter disposed to emit light toward said encoding disc; and
    an optical detector disposed to receive said emitted light from said encoding disc.

11. A computer mouse as described in claim 10, wherein:
    said optical emitter is disposed adjacent to a first side of said wheel; and
    said optical detector is disposed adjacent to a second side opposite to said first side of said wheel.

12. A computer mouse as described in claim 8, further comprising an elastic member coupled to said wheel allowing said wheel to be resiliently translated to activate a switch.

13. A computer mouse as described in claim 8, wherein said encoding disc includes a plurality of apertures formed through said disc.

14. A computer mouse as described in claim 13, wherein said encoding disc is integrally formed with said wheel.

15. A computer mouse as described in claim 14, wherein said encoding disc is integrally formed as a surface of said wheel.

16. A computer mouse as described in claim 15, wherein said encoding disc is integrally formed as a radially projecting side surface of said wheel.

17. A computer mouse as described in claim 8, further comprising a plurality of protuberances disposed on said wheel for engagement with a contact element to generate intermittent interception therebetween when said wheel is being rotated.

18. A computer mouse as described in claim 8, wherein said wheel includes at least one axle.

19. A computer mouse as described in claim 8, wherein said plurality of apertures are formed through a surface of said wheel.

20. A computer mouse as described in claim 19, wherein said apertures are disposed proximate the circumference of said surface of said wheel.

21. A computer mouse as described in claim 20, wherein said apertures are formed in a radially projecting side surface of said wheel.

22. A user interface module comprising:
    a printed circuit board; and
    a wheel being translationally and rotatably coupled to said printed circuit board to facilitate direct rotation of said wheel by said user, said wheel having an encoding signal generating media disposed on a surface thereof.

23. A user interface module as described in claim 22, further comprising:
    an optical emitter disposed to emit light toward said encoding signal generating media; and
    an optical detector disposed to receive said emitted light from said encoding signal generating media.

24. A user interface module as described in claim 23, wherein:
    said optical emitter is disposed on one side of said encoding signal generating media; and
    said optical detector is disposed on an opposite side of said encoding signal generating media.

25. A user interface module as described in claim 23, wherein:
    said optical emitter is disposed on one side of said wheel; and
    said optical detector is disposed on an opposite side of said wheel.

26. A user interface module as described in claim 22, further including a wheel support frame, wherein said wheel is coupled to said frame and said frame is coupled to said printed circuit board.

27. A user interface module as described in claim 22, wherein said wheel includes at least one axle that is rotatably coupled with said wheel support frame.

28. A user interface module as described in claim 22, wherein said encoding signal generating member includes a plurality of apertures that are formed through a surface of said wheel.

29. A user interface module as described in claim 28, wherein said apertures are formed in a radially projecting side surface of said wheel.

30. A user interface module as described in claim 29, wherein said apertures are disposed proximate the circumference of said side surface.

* * * * *